United States Patent
Agrawal et al.

(10) Patent No.: US 12,002,133 B2
(45) Date of Patent: Jun. 4, 2024

(54) VECTOR OBJECT JITTER APPLICATION

(71) Applicant: Adobe Inc., San Jose, CA (US)

(72) Inventors: Reena Agrawal, Dwarka (IN); William C Eisley, Jr., San Francisco, CA (US); Rohit Kumar Guglani, Noida Distt Gautam Budh (IN); Paul A George, Hillsborough, CA (US); Gourav Tayal, Jind (IN); Deep Sinha, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 100 days.

(21) Appl. No.: 17/862,956

(22) Filed: Jul. 12, 2022

(65) Prior Publication Data

US 2024/0020891 A1    Jan. 18, 2024

(51) Int. Cl.
*G06T 11/20* (2006.01)
*G06T 5/70* (2024.01)
*G06T 7/62* (2017.01)

(52) U.S. Cl.
CPC ............. *G06T 11/203* (2013.01); *G06T 5/70* (2024.01); *G06T 7/62* (2017.01)

(58) Field of Classification Search
None
See application file for complete search history.

(56) References Cited

U.S. PATENT DOCUMENTS

| 10,534,530 B2* | 1/2020 | Angelov | G06F 3/0414 |
| 2008/0117214 A1* | 5/2008 | Perani | G06T 11/206 345/441 |
| 2008/0180410 A1* | 7/2008 | McCall | G06T 11/203 345/179 |
| 2011/0175916 A1* | 7/2011 | Noris | G06V 10/469 345/441 |

* cited by examiner

*Primary Examiner* — Edward Martello
(74) *Attorney, Agent, or Firm* — FIG. 1 Patents

(57) ABSTRACT

Jitter application techniques are described for vector objects as implemented by a vector object jitter application system. In an implementation, the vector object jitter application system receives an input defining a stroke to be drawn on a user interface. A vector object is then generated representing the stroke and having a variable width determined by applying jitter to the stroke. The vector object having the variable width is displayed in the user interface as the input is received.

20 Claims, 12 Drawing Sheets

700

702

712

704

714
716  718  720  722

VECTOR OBJECT JITTER APPLICATION

BACKGROUND

Graphic designers and other similar computer users utilize computer-based graphics design software (e.g., applications for digital painting and digital drawing) to design different types of digital artworks, such as posters, billboards, graphics, digital images, and the like. Graphic designers are often faced with decisions to work with either raster graphics or vector graphics. Vector graphics have certain benefits that are not available from raster graphics. For example, vector objects are scalable, and as such, resolution of these objects is retained through scaling to different sizes.

SUMMARY

Jitter application techniques are described as implemented by a vector object jitter application system to generate and display, while a user draws a stroke, a vector object representing the stroke and having visually organic variable characteristics. In one example, the vector object jitter application system receives an input defining a stroke to be drawn on a user interface, along with input data describing characteristics of the input. The input data, for instance, includes pressure and velocity data associated with the input and a nominal width of a vector brush with which the stroke is drawn. Notably, the nominal width dictates how wide a vector object representing the stroke is to be generated along the stroke. An initial width is determined for the vector object by modifying the nominal width along the stroke based on the pressure and velocity data.

A variable width is then determined for the vector object by applying jitter to the initial width (e.g., using a smooth noise function) and in accordance with jitter parameters. The jitter parameters, for instance, include a jitter distance parameter and a jitter size parameter. A uniform distance interval is calculated using the jitter distance parameter and based on the nominal width. The vector object jitter application system determines locations, separated by the uniform distance interval, where jitter is to be applied to the vector object. Further, a maximum amount of jitter is calculated for each of the determined locations using the jitter size parameter and based on the initial width of the vector object. The maximum jitter amount, for instance, indicates a maximum unit of length that the initial width of the vector object is adjustable at a given location.

A smooth noise function is leveraged to determine a variable width for the vector object by applying a variable jitter amount to the vector object at each of the determined locations. While the variable jitter amount is different among the determined locations, the variable jitter amount for a given location does not exceed the maximum jitter amount for the given location. The smooth noise function adjusts the initial width at each of the determined locations by the variable jitter amount determined for the locations. By leveraging a smooth noise function, the variable width of the vector object is gradually increased and/or gradually decreased at corresponding portions along the vector object. The vector object jitter application system then outputs the vector object with the variable width for display in the user interface concurrently in real time as an input is received via the user interface, e.g., while the user draws the stroke in the user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Figure 1:
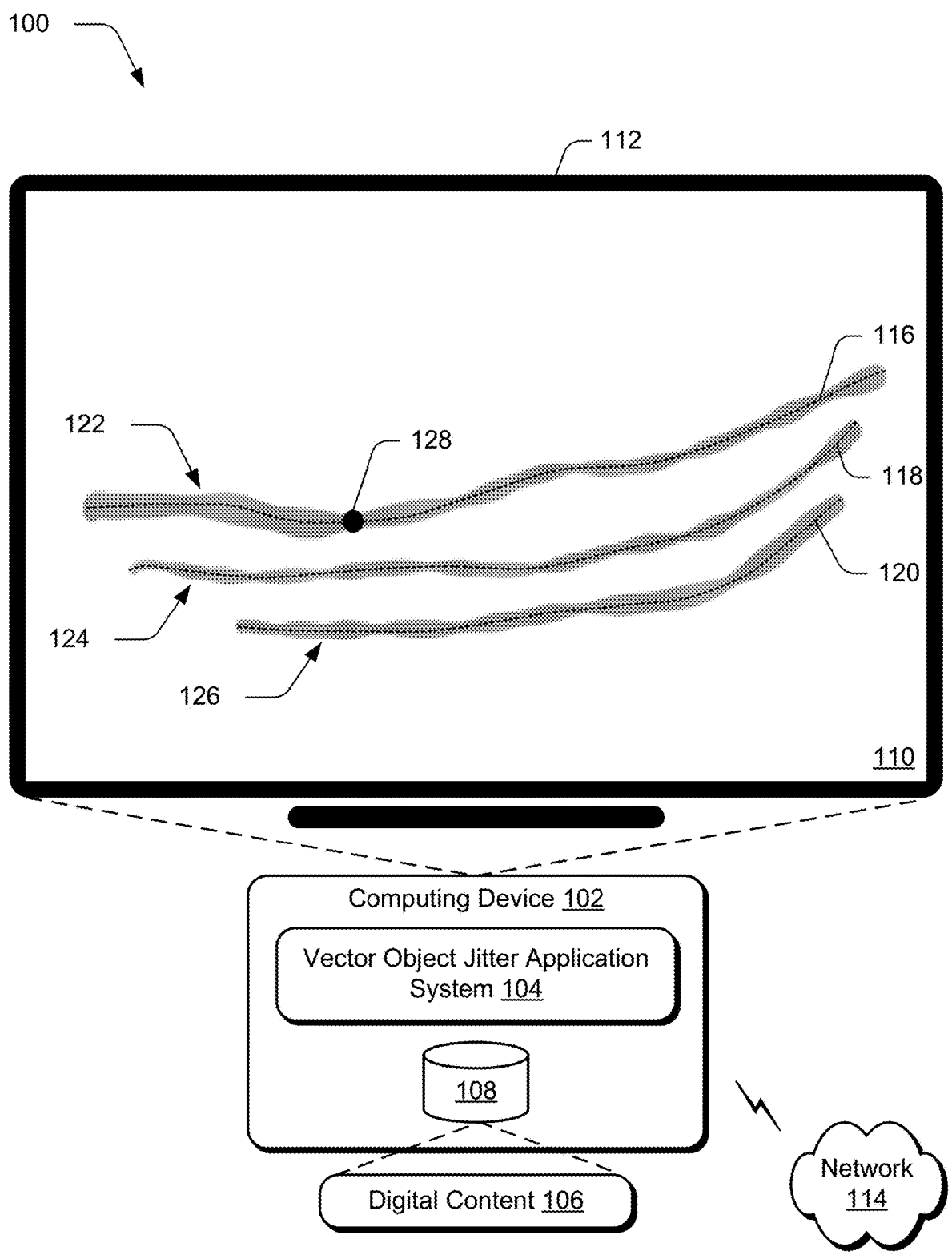
FIG. 1 is an illustration of an environment in an example implementation that is operable to employ vector object jitter application techniques described herein.

Graphic design applications often include vector brushes for generating digital vector objects based on a brush stroke drawn on a digital canvas. However, conventional vector brushes fail to provide functionality to vary visual characteristics of a vector object as a brush stroke is drawn by a graphic designer, e.g., in real time. Moreover, conventional techniques for introducing variable visual characteristics to vector objects often mimic variations of an input shape, thus creating vector objects with an inorganic and computer-generated appearance that is readily viewable as repeated and predictable changes to the vector objects and thus lack realism. Further, these conventional techniques introduce variable visual characteristics as a post-processing operation, thus giving users of these conventional techniques an inorganic drawing experience.

In one conventional technique to introduce variable width to vector objects, a width of a manually created input shape is applied to vector objects having different lengths and different curvatures. However, the width variations among the vector objects generated from the input shape are not different. Instead, the vector objects have the same width variations as the input shape, except that the vector objects are stretched or compressed depending on the length of the vector objects and positioned differently depending on the curvature of the vector objects. This gives the vector objects a computer-generated, inorganic, and aesthetically displeasing appearance.

The challenges associated with conventional techniques are further exacerbated by introduction of variable visual characteristics for a vector object as a post-processing technique. Indeed, in the conventional technique described above, a vector object is not displayed until after a user completes an input that defines a location for the vector object. Thus, in addition to producing vector objects with an inorganic appearance, conventional techniques provide the user with an inorganic drawing experience. This is because the post-processing operations implemented by conventional techniques do not display the variable width of the vector objects while a user draws a stroke, i.e., in real time. As such, the conventional techniques fail to mimic a physical drawing experience, e.g., as if the user is drawing using a physical writing utensil on a physical piece of paper.

Accordingly, jitter application techniques are described as implemented by a vector object jitter application system to generate and display, while a user draws a stroke, a vector object representing the stroke and having visually organic variable width characteristics. Initially, the vector object jitter application system receives an input defining a stroke drawn to be drawn on a user interface. The stroke, for instance, is a path in the user interface along which a vector object is to be generated and displayed in accordance with the described techniques.

In addition to receiving the input defining the stroke, the vector object jitter application system also receives input data describing characteristics of the input, including pressure and velocity data associated with the input as well as a vector brush with which the stroke is drawn. The pressure data indicates a pressure of the input at corresponding portions of the input, while the velocity data indicates a velocity of the input at corresponding portions of the input. The vector brush represents functionality for generating a vector object along the stroke with various shape characteristics. The various shape characteristics include, for example, a nominal width of the vector brush, which dictates a basis for how wide the vector object is to be generated along the stroke.

An initial width determination module is then employed to determine an initial width for the vector object based on the input data. To do so, the initial width determination module modifies the nominal width of the vector brush along the stroke based on the pressure and velocity data of the input. For example, portions of the stroke drawn with increased pressure and/or decreased velocity cause the initial width of corresponding portions of the vector object to be increased with respect to the nominal width of the vector brush. Similarly, portions of the stroke drawn with decreased pressure and/or increased velocity cause the initial width of corresponding portions of the vector object to be increased with respect to the nominal width of the vector brush.

A jitter application module is then employed to determine a variable width for the vector object by applying jitter using a smooth noise function and in accordance with jitter parameters. To do so, the jitter application module initially receives the jitter parameters, which include a jitter distance parameter and a jitter size parameter. The jitter parameters are specifiable in a variety of ways, examples of which include receiving user input selecting a vector brush having predefined jitter parameters and receiving user input individually specifying the jitter size parameter and the jitter distance parameter.

In some implementations, the jitter distance parameter is received as a function (e.g., percentage, fraction, multiplier, etc.) of the nominal width of the vector brush with which the stroke is drawn. In this way, the jitter application module is configured to calculate a uniform distance interval based on the nominal width of the vector brush. Notably, the uniform distance interval is a unit of length (e.g., a number of pixels) along the vector object between instances of jitter application. Accordingly, the jitter application module is configured to determine locations along the stroke, separated by the uniform distance interval, where jitter is to be applied.

Further, the jitter size parameter is received as a function (e.g., percentage, fraction, multiplier, etc.) of the initial width of the vector object. In this way, the jitter application module is configured to determine a maximum amount of jitter for each of the determined locations on the vector object based on the initial width of the vector object at the determined locations. Notably, the maximum amount of jitter determined for a given location is a maximum unit of length (e.g., a maximum number of pixels) that the initial width of the vector object is adjustable at the given location. Since the maximum amount of jitter is a function of the initial width, which differs among the different locations along the vector object, the maximum amount of jitter similarly differs among the different locations along the vector object.

A smooth noise function is then employed to adjust the initial width of the vector object at each of the determined locations differently and based on the maximum amount of jitter determined for the locations. For instance, the smooth noise function applies a variable amount of jitter at each of the determined locations to adjust the initial width. Notably, the variable amount of jitter determined for a given location is configured not to exceed the maximum amount of jitter determined for the given location.

In variations, the smooth noise function is leveraged to adjust the initial width of the vector object by the variable jitter amount in a variety of ways, e.g., increasing or decreasing the initial width of the vector object, adjusting the initial width on either side of the vector object or on one side of the vector object, adjusting the initial width by different jitter amounts on either side of the vector object, etc. Regardless of a manner in which the initial width is adjusted, the jitter is applied to adjust the initial width using a smooth noise function, such as a Perlin noise function. One defining characteristic of smooth noise functions is that variations are applied to visual characteristics in a smooth and uniform manner. As a result, the width of the jittered vector object varies gradually, e.g., by gradually increasing and gradually decreasing the width of the vector object at each of the determined locations.

By leveraging the smooth noise function to apply jitter to the vector object in accordance with the jitter parameters, the vector object jitter application system determines a width for the vector object that is varied differently, yet uniformly along the vector object. Indeed, by applying jitter in accordance with the jitter distance parameter, width variations are dispersed evenly at uniform distance intervals along the vector object. Further, by applying jitter using the smooth noise function and in accordance with the jitter size parameter, the width variations are different, but the differences between individual width variations are moderate. Moreover, by using the smooth noise function, the variable width of the vector object is gradually increased and decreased along the vector object, rather than abruptly. Since conventional techniques are dependent on a width of an input shape, width variations determined using such conventional techniques are substantially similar to the input shape and are not evenly dispersed along a resulting vector object. Accordingly, vector objects generated by the vector object jitter application system have variable widths with a more organic and visually pleasing appearance as compared to conventional techniques.

Further in contrast to conventional techniques, the vector object jitter application system outputs the vector object with the variable width for display in the user interface concurrently as the input defining the stroke is received, i.e., while a user draws the stroke in the user interface. In other words, at any point during an input that defines a stroke, the vector object jitter application system displays the vector object that represents the stroke having the variable width determined in accordance with the described techniques up to a current location of the input. Therefore, the vector object jitter application system is capable of determining the initial width for the vector object, determining the variable width for the vector object using the smooth noise function and in accordance with the jitter parameters, and generating the vector object for display in the user interface with the variable width in real time when the stroke is being drawn. By doing so, the vector object jitter application system provides a more natural and organic drawing experience as compared to conventional techniques that introduce variable characteristics as a post-processing operation. This is because the vector object jitter application system mimics a physical drawing experience, e.g., as if the user is drawing using a physical writing utensil on a physical piece of paper. Further discussion of these and other examples and advantages are included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ vector object jitter application techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations "over the cloud" as described in FIG. 10.

The computing device 102 is illustrated as including a vector object jitter application system 104. The vector object jitter application system 104 is implemented at least partially in hardware of the computing device 102 to process and transform digital content 106, which is illustrated as maintained in storage 108 of the computing device 102. Such processing includes creation of the digital content 106, modification of the digital content 106, and rendering of the digital content 106 in a user interface 110 for output, e.g., by a display device 112. The digital content 106 refers to any of a variety of different types of digital content, such as digital images, graphic artwork, digital videos, etc. In some examples, the digital content 106 includes applications for creating digital content such as applications for digital drawing and/or painting which are also available to the vector object jitter application system 104 and the computing device 102. Although illustrated as implemented locally at the computing device 102, functionality of the vector object jitter application system 104 is also configurable as whole or part via functionality available via the network 114, such as part of a web service or "in the cloud."

The vector object jitter application system 104 represents functionality to apply jitter to a stroke drawn in a user interface while the stroke is drawn by a user. As described herein, applying "jitter" to a stroke is varying a visual characteristic of a vector object that represents the stroke, such as width, size, position, eccentricity, and so on, at corresponding portions of the vector object. In the illustrated implementation in the user interface 110, for instance, the vector object jitter application system 104 receives input defining three strokes to be drawn on the user interface 110—a first stroke 116, a second stroke 118, and a third stroke 120. Further, vector objects 122, 124, 126 representing the strokes are generated along the strokes 116, 118, 120 with a variable width determined by applying jitter in accordance with techniques described herein.

To generate the vector objects 122, 124, 126 with the variable width, the vector object jitter application system 104 initially determines an initial width for the vector objects 122, 124, 126, e.g., a width of the vector object before jitter is applied. Further, the vector object jitter application system 104 receives one or more jitter parameters. For example, a first jitter parameter is received by the vector object jitter application system 104 that controls where jitter is to be applied to the vector objects 122, 124, 126. In implementations, the first jitter parameter is used as a basis to determine locations along the strokes 116, 118, 120, separated by a uniform distance, where jitter is to be applied to the vector objects 122, 124, 126. Additionally or alternatively, a second jitter parameter is received by the vector object jitter application system 104 that indicates a maximum amount of jitter that is applicable to the vector objects 122, 124, 126 at the locations determined based on the first jitter parameter.

Further, a smooth noise function is employed to determine a variable amount of jitter to be applied to the vector objects 122, 124, 126 at the locations determined by the first jitter parameter. Notably, the variable amount of jitter determined for a respective location of the vector object does not exceed the maximum amount of jitter determined based on the second jitter parameter. In the illustrated implementation, jitter is applied to the vector objects 122, 124, 126 by adjusting the initial width of the vector objects 122, 124, 126 at each of the determined locations by the variable amount of jitter and using the smooth noise function. The vector objects 122, 124, 126 are then output for display in the user interface 110 having a variable width as determined by applying the jitter.

Notably, the vector object jitter application system 104 is configured to generate and display the vector objects 122, 124, 126 with the applied jitter in real time as input defining the strokes 116, 118, 120 is received via the user interface 110, e.g., while a user draws the strokes. Consider an example in which the stroke 116 is currently being drawn from left to right in the user interface 110 up to point 128.

In accordance with this example, the portion of the vector object 122 to the left of point 128 is displayed in the user interface 110 with the jitter applied. Thus, the vector object jitter application system is configured to generate the vector objects 122, 124, 126, apply jitter, and display the vector objects 122, 124, 126 with the applied jitter concurrently while the strokes 116, 118, 120 are being drawn.

A variety of conventional techniques have been employed for introducing variable characteristics to vector objects, however, these techniques typically involve applying a width of a manually created input shape to vector objects having different lengths and different curvatures. However, the width variations among the resulting vector objects generated from the input shape are dependent on the width of the input shape. This creates inorganic and aesthetically displeasing variations among different vector objects as the same or substantially similar width variations are simply stretched, compressed, or curved among the different vector objects. Alternatively, a user employing this example conventional technique can manually create many different input shapes to introduce different variations to vector objects, thereby resulting in an inefficient use of computational resources.

In contrast to these conventional techniques, the techniques implemented by the vector object jitter application system 104 generate vector objects 122, 124, 126 with variable width without relying on variations included in an original input shape. Indeed, the vector objects 122, 124, 126 are illustrated as input using the same jitter parameters, yet the width of the vector objects 122, 124, 126 is varied differently among different locations on a single respective vector object as well as among the different vector objects 122, 124, 126. Moreover, the vector object jitter application system 104 enables the user to generate many vector objects with different variable widths without creating a multitude of different input shapes upon which the variable widths are based.

While the variations in the width of the vector objects 122, 124, 126 differ in size, the variations are applied uniformly and consistently. Indeed, consistent amounts of jitter are applied to the vector objects 122, 124, 126 with uniform spacing based on the jitter parameters. This contrasts with the above-mentioned conventional technique which creates inconsistently sized width variations and inconsistent spacing between width variations depending on different lengths and/or curvatures of different vector objects. By applying variable amounts of jitter to the vector objects 122, 124, 126 in a uniform and consistent manner, the vector object jitter application system 104 generates the vector objects 122, 124, 126 with an organic and aesthetically pleasing variable characteristic.

Moreover, the above-described conventional techniques introduce variable characteristics to vector objects as a post-processing operation. Indeed, the above-mentioned conventional technique generates a vector object after an input defining a location for the vector object has been completed. This contrasts with techniques implemented by the vector object jitter application system 104 which generates a vector object that represents a stroke drawn on a user interface, applies jitter to the vector object, and displays the vector object in real time while an input defining the stroke is received. This mimics a physical drawing experience (e.g., as if the user is drawing using a physical writing utensil on a physical piece of paper), and as such, the vector object jitter application system 104 provides a user with a more natural and organic drawing experience as compared to conventional techniques.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Vector Object Jitter Application

The following discussion describes vector object jitter application techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-10 in parallel with a procedure 500 of FIG. 5.

Figure 2:
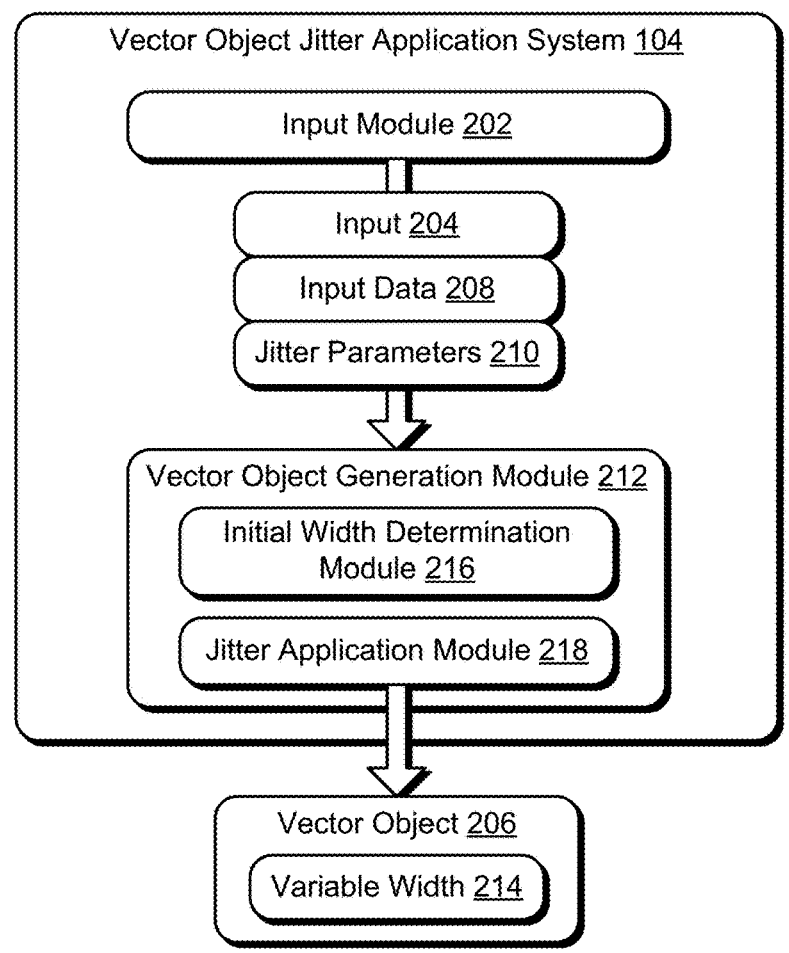
FIG. 2 depicts a system in an example implementation showing operation of the vector object jitter application system of FIG. 1 in greater detail

FIG. 2 depicts a system 200 in an example implementation showing operation of the vector object jitter application system 104 of FIG. 1 in greater detail. The vector object jitter application system 104 includes an input module 202 that is configured to receive an input 204 defining a stroke to be drawn on a user interface 110 (block 502). Notably, the stroke defines a location in the user interface 110 where a vector object 206 is to be generated. The input module 202 is further illustrated as receiving input data 208, which describes characteristics of the input 204. These characteristics include, for example, a pressure of the input 204 and/or a velocity of the input 204. Jitter parameters 210 are also received by the input module 202, which include a first jitter parameter that controls where on the vector object 206 jitter is to be applied and a second jitter parameter that controls respective amounts of jitter to be applied at corresponding portions of the vector object 206.

In accordance with the described techniques, a vector object generation module 212 receives the input 204, the input data 208, and the jitter parameters 210. The vector object generation module 212 is configured to generate a vector object 206 representing the stroke that includes applying jitter to the stroke (block 504), e.g., to vary width and/or locations at which the jitter is applied.

In a first such example, an initial width determination module 216 implemented by the vector object generation module 212 is initially utilized to determine an initial width for the vector object 206 based on the input data 208. The initial width determination module 216, for instance, determines an initial width of the vector object 206 based, in part, on the pressure and the velocity of the input 204.

Further, a jitter application module 218 implemented by the vector object generation module 212 is utilized to determine the variable width 214 of the vector object 206 by applying jitter to the initial width in accordance with the jitter parameters 210. To do so, the jitter application module 218 adjusts the initial width of the vector object 206 at locations determined based on the first jitter parameter and by an amount controlled by the second jitter parameter.

The vector object generation module 212 then displays the vector object 206 having the jitter (e.g., variable width 214) in the user interface as the input 204 is received (block 506). In other words, the vector object generation module 212 determines the initial width of the vector object 206, determines the variable width 214 for the vector object 206 by applying jitter, and displays the jittered vector object 206 having the variable width 214 in real time as the stroke is drawn. Therefore, the vector object jitter application system 104 is capable of displaying the jittered vector object 206 along an ongoing stroke and up to a current location of the ongoing stroke.

Although the vector object jitter application system 104 is described herein as generating and applying jitter to vector objects, it is to be appreciated that the techniques described herein are applicable to generate and apply jitter to raster objects as well.

Figure 3:
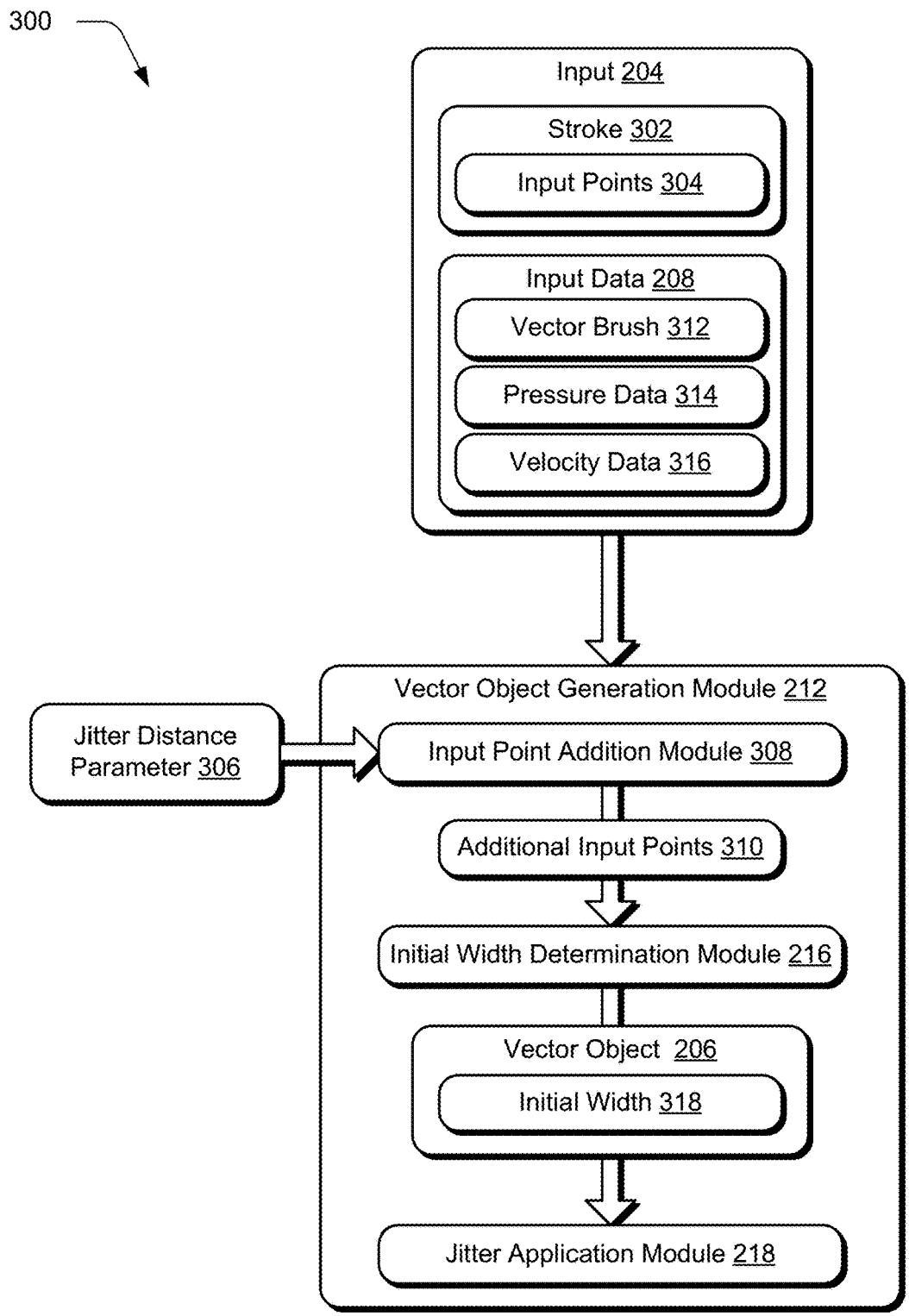
FIG. 3 depicts a system in an example implementation showing operation of the vector object generation module of FIG. 2 in greater detail.

FIG. 3 depicts a system 300 in an example implementation showing operation of the vector object generation module 212 of FIG. 2 in greater detail. As shown, the vector object generation module 212 receives an input 204 defining a stroke 302 to be drawn on the user interface 110. For example, a user of the vector object jitter application system 104 draws the stroke 302 in the user interface 110 using a stylus or finger on a touch screen of the computing device 102, using a connected mouse and associated cursor, and so on. Although example implementations for vector object jitter application are described herein based on an input 204 defining a two-dimensional stroke 302 in the user interface, it is to be appreciated that the vector object jitter application system 104 is capable of generating a jittered vector object 206 in accordance with the described techniques based on an input 204 defining different types of objects in the user interface 110. In some examples, the input 204 defines any one of a variety of two-dimensional shapes, including but not limited to circles, rectangles, irregular shapes, ellipses, etc. In additional examples, the input 204 defines any one of a variety of three-dimensional shapes, including but not limited to three-dimensional paths, cubes, cylinders, spheres, ellipsoids, etc.

In implementations, the input 204 is received as a plurality of input points 304 defining the stroke 302 in the user interface 110 (block 508). For example, the input 204 is received as a plurality of input points 304 placed along the stroke 302 at defined time intervals (e.g., every millisecond, every tenth of a millisecond, etc.) during the input 204. Given this, a portion of the input 204 that is relatively faster than other portions of the input 204 produces proximate input points 304 along the stroke 302 that are separated by a greater distance as compared to slower portions of the input 204.

As further described below with reference to FIG. 4, the jitter application module 218 is configured to apply jitter in accordance with a jitter distance parameter 306. The jitter distance parameter 306 is used to determine locations along the stroke 302 where jitter is to be applied to the vector object 206. In one or more implementations, the locations determined based on the jitter distance parameter 306 are separated by a uniform distance interval. By way of example, the jitter distance parameter 306 causes the jitter application module 218 to apply jitter to the vector object 206 at every thirty-pixel-interval along the stroke 302.

Furthermore, the jitter application module 218 is configured, in some implementations, to apply jitter to the vector object 206 by adjusting the input points 304. For example, the jitter application module 218 adjusts a positioning of the input points 304 to increase and/or decrease a width of the vector object 206 at the locations determined based on the jitter distance parameter 306. Therefore, if a distance between proximate input points 304 is too large (e.g., in relation to a threshold), the jitter application module 218 would be unable to apply jitter to the vector object 206 in accordance with the uniform distance interval. To promote uniform spacing between instances of jitter application, an input point addition module 308 is configured to add at least one additional input point 310 between a pair of proximate input points 304 separated by greater than a threshold distance (block 510).

To do so, the input point addition module 308 receives the stroke 302, the corresponding input points 304, and the jitter distance parameter 306. The input point addition module 308 is configured to determine a maximum separation distance to be maintained between proximate input points 304 in order to apply jitter in accordance with the jitter distance parameter 306. In implementations, the maximum separation distance is a function of the uniform distance interval, e.g., fifty percent of the uniform distance interval.

The input point addition module 308 further includes functionality to add additional input points 310 between proximate input points 304 that are separated by greater than the maximum separation distance. For example, the input point addition module 308 adds a number of additional input points 310 such that each of the input points (including both the original input points 304 and the additional input points 310) along the stroke 302 are separated by less than the maximum separation distance. By doing so, the input point addition module 308 enables the jitter application module 218 to apply jitter to the vector object 206 in accordance with the uniform distance interval indicated by the jitter distance parameter 306.

In one or more implementations, the input point addition module 308 is configured to limit an amount of additional input points 310 added between proximate input points 304. Consider an example in which a user is implementing the vector object jitter application system 104 while working with a large canvas, e.g., a billboard-sized canvas, a poster-sized canvas, etc. In this example, the user draws a stroke 302 on the user interface 110 across the large canvas (e.g., from corner-to-corner) while utilizing a relatively small jitter distance parameter 306. Due to the relatively small jitter distance parameter 306 and the relatively long stroke 302 drawn at a relatively fast rate, the jitter application module 218 is capable of being employed to apply jitter at a very large number of locations along the stroke 302, and in turn, the input point addition module 308 is capable of being employed to add a very large number of additional input points 310 between proximate input points 304 along the stroke 302. This increases processing time to apply jitter to a vector object 206 representing the stroke 302, thereby negatively effecting performance of the computing device 102.

In order to achieve better performance in these scenarios, the input point addition module 308 limits the number of additional input points 310 added between proximate original input points 304. For example, the input point addition module 308 is configured to add up to a threshold number of additional input points 310 between successive original input points 304. In effect, this increases the uniform distance interval indicated by the jitter distance parameter 306 and causes jitter to be applied to the vector object 206 at a fewer number of locations along the stroke 302. Thus, in certain scenarios, the complexity of the jittered vector object 206 is limited by a length of the stroke 302 in combination with the time it takes a user to draw the stroke 302 in the user interface 110.

The input 204 is further illustrated as including the input data 208, which in some examples includes a vector brush 312 used to provide the input 204 that defines the stroke 302. Notably, the vector brush 312 represents functionality for generating a vector object 206 along the stroke 302 drawn in the user interface 110. In implementations, the vector brush 312 includes shape customization characteristics that dictate a shape of a vector object generated using the vector brush 312. In variations, the vector brush 312 is associated with a round shape characteristic to generate a vector object along the stroke 302 with round edges, a flat shape characteristic to generate a vector object along the stroke 302 with flat edges, a tapered shape characteristic to generate a vector object along the stroke 302 with tapered edges, and so forth. The vector brush 312 also includes a nominal width (e.g., a number of pixels) that dictates how wide a vector object is to be generated along the stroke 302 drawn with the vector brush 312.

The input data 208 further includes pressure data 314 representing a pressure of the input 204 at corresponding portions of the stroke 302. By way of example, the pressure data 314 includes pressure values associated with the input 204 at each of the input points 304. The input data 208 also includes velocity data 316 representing a velocity of the input 204 at corresponding portions of the stroke 302. For example, the velocity data 316 includes velocity values associated with the input 204 at each of the input points 304. Thus, each respective input point 304 includes a pressure value indicating a pressure of the input 204 applied at the respective input point 304, and a velocity value indicating a velocity of the input 204 applied at the respective input point 304.

The input data 208 and the stroke 302, including the input points 304 and the additional input points 310 are received by the initial width determination module 216. The initial width determination module 216 is configured to determine an initial width 318 of the vector object 206 based on the input 204 (block 512). To do so, the initial width determination module 216 modifies the nominal width of the vector brush 312 along the stroke 302 based on the pressure data 314 and the velocity data 316.

In some examples, the initial width 318 of the vector object 206 increases with respect to the nominal width of the vector brush 312 at input points 304 along the stroke 302 that are associated with relatively lower velocity values and/or relatively higher pressure values as compared to other input points 304. Further, the initial width 318 of the vector object 206 decreases with respect to the nominal width of the vector brush 312 at input points 304 along the stroke 302 that are associated with relatively higher velocity values and/or relatively lower pressure values as compared to other input points 304. In other words, the initial width 318 of the vector object 206 increases at locations along the stroke 302 where the stroke 302 is drawn with increased pressure and/or decreased velocity, and the initial width 318 of the vector object 206 decreases at locations along the stroke 302 where the stroke 302 is drawn with decreased pressure and/or increased velocity. The vector object 206 having the initial width 318 is then provided as input to the jitter application module 218.

Figure 4:
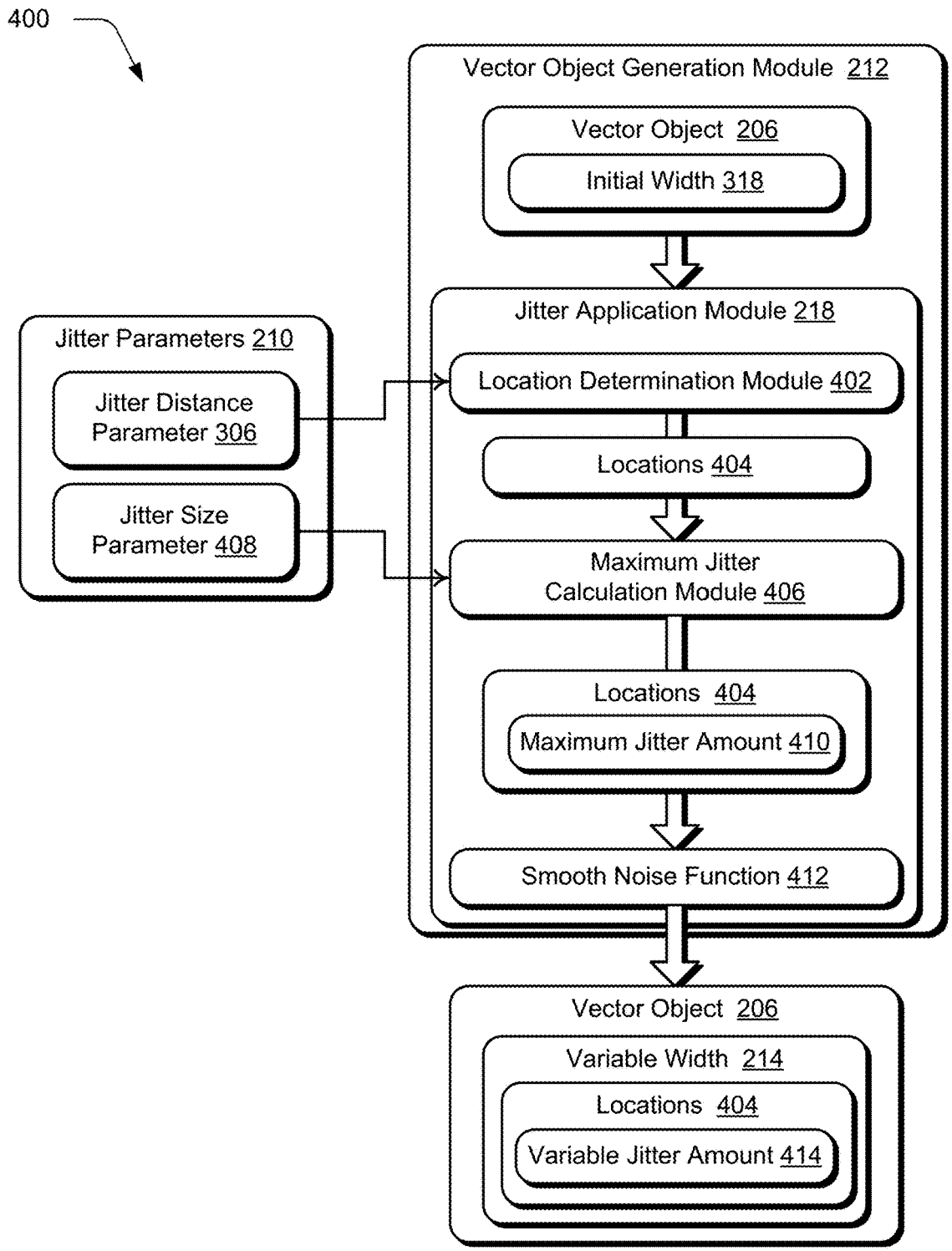
FIG. 4 depicts a system in an example implementation showing operation of the jitter application module of FIG. 2 in greater detail.
Figure 5:
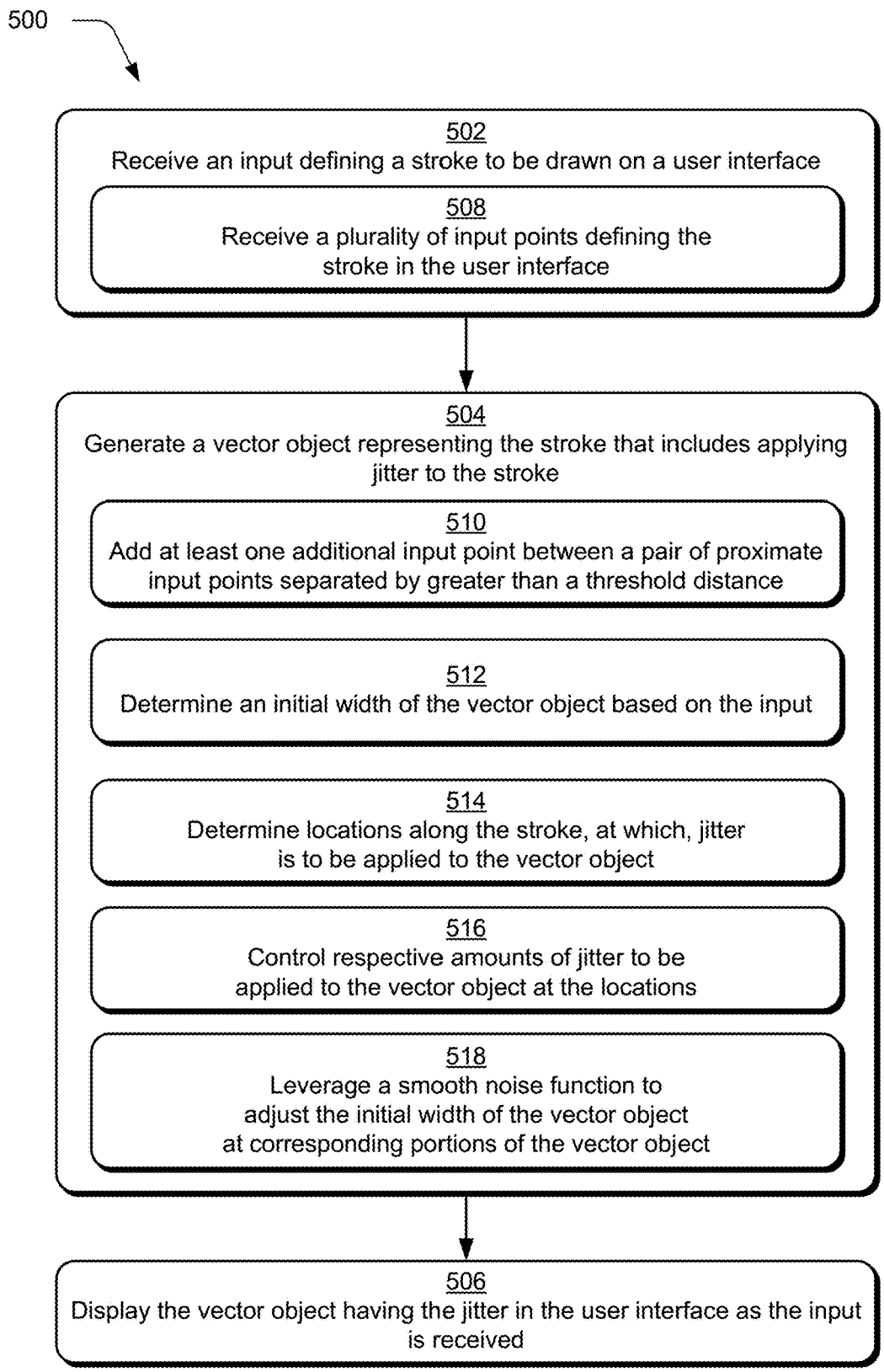
FIG. 5 is a flow diagram depicting a procedure in an example implementation of vector object jitter application.

FIG. 4 depicts a system 400 in an example implementation showing operation of the jitter application module 218 of FIG. 2 in greater detail. As shown, the jitter application module 218 receives the vector object 206 having the initial width 318 as determined by the initial width determination module 216. Generally, the jitter application module 218 is configured to adjust the initial width 318 of the vector object 206 at corresponding portions of the vector object 206 based on the jitter parameters 210.

While example implementations for vector object jitter application are described herein as applying jitter to adjust a width of a vector object, it is to be appreciated that the vector object jitter application system 104 is capable applying jitter to other characteristics of vector objects. In one such example, the vector object jitter application system 104 applies jitter to adjust a position of the vector object 206 at corresponding locations on the vector object 206. In accordance with this example, a positioning of the stroke 302 drawn via the user interface 110 is jittered to generate a vector object along an adjusted stroke. In some examples, the vector object jitter application system 104 applies jitter to adjust both position and width of the vector object 206 at corresponding locations of the vector object 206.

The jitter distance parameter 306 and the vector object 206 having the initial width 318 are provided as input to a location determination module 402. The location determination module 402 is configured to determine locations along the stroke 302, at which, jitter is to be applied to the vector object 206 (block 514). For example, the location determination module 402 determines locations 404 along the stroke 302, separated by a uniform distance interval, where jitter is to be applied to the vector object 206. To do so, the location determination module 402 initially calculates the uniform distance interval based on the jitter distance parameter 306 and the nominal width of the vector brush 312.

In one or more implementations, the jitter distance parameter 306 is specified as a function (e.g., percentage, fraction, multiplier, etc.) of the nominal width of the vector brush 312 used to draw the stroke 302. By way of example, the uniform distance interval is calculated using the following equation:

$$(\text{Nominal Width}) \times (\text{jitter Distance Parameter}) \times 10$$

Thus, in an example in which the nominal width of the vector brush 312 is ten pixels and the jitter distance parameter 306 is sixty percent, the uniform distance interval is calculated to be sixty pixels. Upon calculating the uniform distance interval, the location determination module 402 determines the locations 404 at every uniform distance interval along the stroke 302. Continuing with the previous example of a sixty-pixel uniform distance interval, the location determination module 402 determines a location 404, at which to apply jitter to the vector object 206, at every sixty pixels along the stroke 302.

The locations 404 and a jitter size parameter 408 are received by a maximum jitter calculation module 406, which is configured to control respective amounts of jitter to be applied to the vector object 206 at the locations 404 (block 516). For example, the maximum jitter calculation module 406 is configured to determine a maximum jitter amount 410 that is applicable at each of the locations 404 on the vector object 206 using the jitter size parameter 408. The maximum jitter amount 410, for instance, indicates that the initial width 318 of the vector object 206 is adjustable by a maximum unit of length (e.g., a maximum number of pixels) at a respective location 404.

In some implementations, the jitter size parameter 408 is specified as a function (e.g., percentage, multiplier, fraction, etc.) of the initial width 318 of the vector object 206. In one example, the initial width 318 of the vector object 206 at a respective location 404 is ten pixels and the jitter size parameter 408 is sixty percent. In accordance with this example, the maximum jitter amount 410 for the respective location 404 is six pixels. As such, the initial width 318 of the vector object 206 at the respective location 404 is adjustable by up to six pixels. Since the maximum jitter amount 410 is a function of the initial width 318 of the vector object 206, the maximum jitter amount 410 is different at the different locations 404 of the vector object 206. This is because the initial width 318 of the vector object 206 is different at different locations 404 due to different pressure data 314 and velocity data 316 of the input 204 at the different locations 404.

The locations 404 on the vector object 206 along with the maximum jitter amount 410 determined for each of the locations 404 are received by a smooth noise function 412. The jitter application module 218 is configured to leverage the smooth noise function 412 to adjust the initial width 318 of the vector object 206 at corresponding portions of the vector object 206 (block 518). For example, the smooth noise function 412 is configured to adjust the initial width 318 by applying a variable jitter amount 414 at each respective location 404 that does not exceed the maximum jitter amount 410 determined for the respective location 404.

In one or more implementations, the smooth noise function 412 is a Perlin noise function configured to apply Perlin noise to the vector object 206 at each of the locations 404. Thus, while example implementations for vector object jitter application may be shown and described herein as utilizing a Perlin noise function to apply Perlin noise to the vector object 206, it is to be appreciated that the vector object jitter application system 104 is capable of utilizing any one of a variety of smooth noise functions without departing from the spirit or scope of the described techniques. In examples, the smooth noise function 412 is a Simplex noise function, a Simulation noise function, a Wavelet noise function, and so on.

In order to apply jitter to the vector object 206, the smooth noise function 412 is configured to determine a variable jitter amount 414 to apply to the vector object 206 at each of the locations 404. While the variable jitter amount 414 is randomly selected at a respective location 404 (e.g., using a randomization function), the variable jitter amount 414 is constrained by the maximum jitter amount 410 for the respective location. Notably, the variable jitter amount 414 for a given location 404 represents how much jitter is actually applied to the vector object 206 at the given location 404. For example, the variable jitter amount 414 is a unit of length (e.g., a number of pixels) indicating how much the initial width 318 is to be adjusted at a respective location 404 on the vector object 206. Thus, given a location 404 associated with a maximum jitter amount 410 of five pixels, the smooth noise function 412 is configured to randomly select a pixel value between zero and five pixels for the variable jitter amount 414 at the location 404.

The smooth noise function 412 is leveraged to adjust the initial width 318 of the vector object 206 by the variable jitter amount 414 in a variety of different ways. In variations, the smooth noise function 412 adjusts the initial width 318 at a location 404 by increasing the initial width 318 by the variable jitter amount 414 on either side of the vector object 206, decreasing the initial width 318 by the variable jitter amount 414 on either side of the vector object 206, increasing/decreasing the initial width 318 by the variable jitter amount 414 on one side of the vector object 206, increasing/decreasing the initial width 318 of the vector object 206 by different variable jitter amounts 414 on either side of the vector object 206, or any combination thereof.

To determine the variable width 214 for the vector object 206, the smooth noise function 412 is configured to apply the variable jitter amount 414 at each of the locations 404. One defining characteristic of smooth noise functions is that variations are applied to visual characteristics in a smooth and uniform manner. Thus, by using the smooth noise function 412, the jitter application module 218 is capable of generating smooth and gradual transitions for visual characteristics that are "jittered." For example, the smooth noise function 412 uniformly distributes the variable width 214 of the vector object 206 at each of the locations 404 between the initial width 318 and an adjusted width (as adjusted by the variable jitter amount 414). In other words, the variable width 214 of the vector object 206 at a respective location 404 gradually increases from the initial width 318 up to the adjusted width (as adjusted by the variable jitter amount 414), and then gradually decreases from the adjusted width back down to the initial width 318.

The vector object generation module 212 then outputs the vector object 206 having the variable width 214 for display in the user interface 110. As further shown and discussed below with reference to FIG. 8, the vector object 206 representing the stroke 302 is generated and displayed by the vector object generation module 212 in real time while the user draws the stroke 302.

Figure 6A:
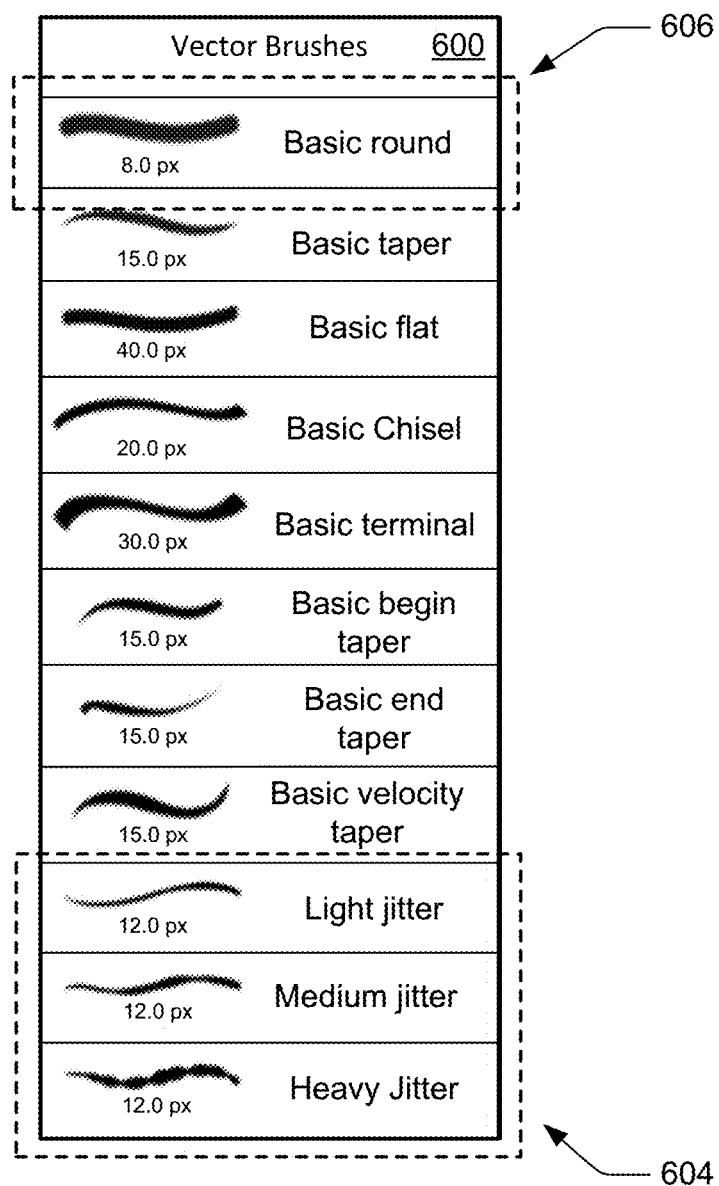
FIGS. 6A and 6B depict example user interfaces for specifying a vector brush and associated jitter parameters.
Figure 6B:
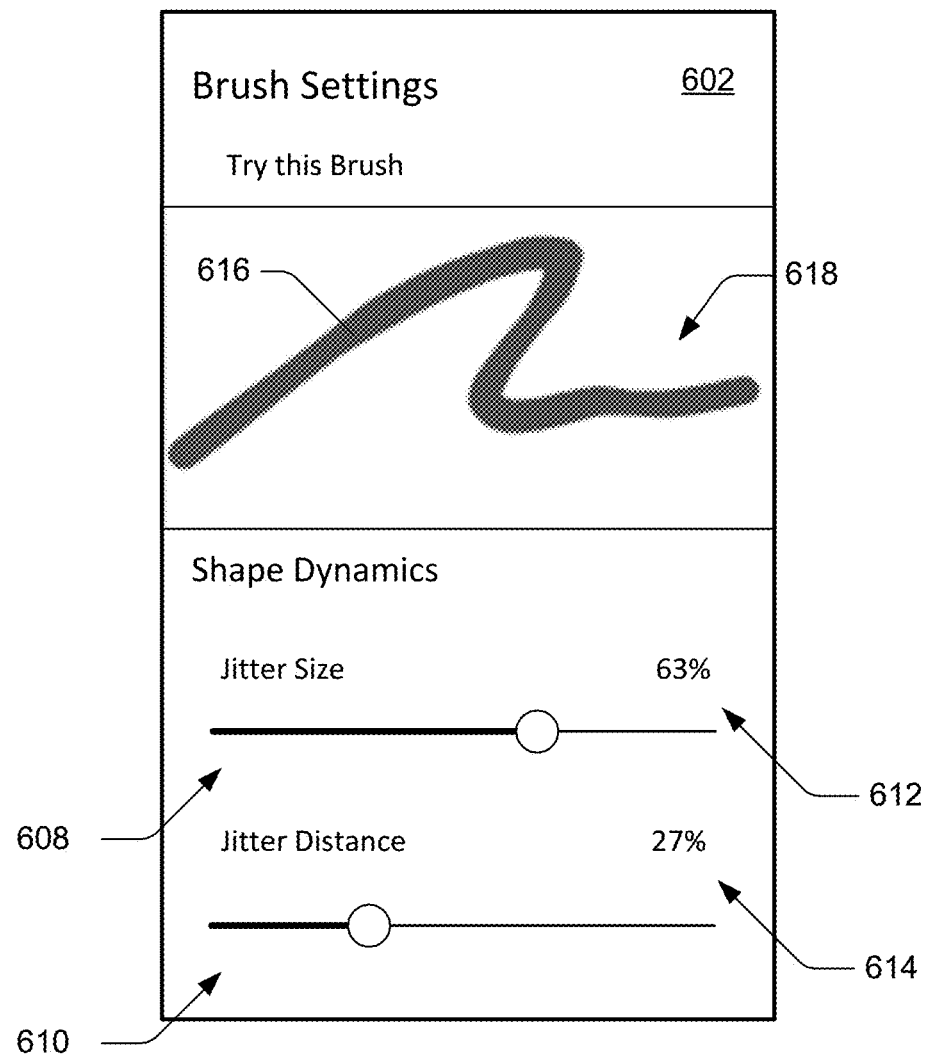

FIGS. 6A and 6B depict example user interfaces 600, 602 for specifying a vector brush and associated jitter parameters 210. In particular, FIG. 6A depicts a user interface 600 for specifying one or more vector brushes with which a user draws the stroke 302. The user interface 600 includes a plurality of selectable vector brushes having different shape characteristics. As shown at 604, the shape characteristics of at least some of the selectable vector brushes include different jitter characteristics. For example, the selectable vector brushes include a light jitter vector brush, a medium jitter vector brush, or a heavy jitter vector brush each having predefined jitter parameters 210.

The light jitter brush, for instance, has a predefined jitter distance parameter 306 that is larger than the medium and heavy jitter brushes and a predefined jitter size parameter 408 that is smaller than the medium and heavy jitter brushes. Thus, the light jitter brush is leveraged to create vector objects with width variations that are fewer in quantity and smaller in magnitude than the medium and heavy jitter brushes. In contrast, the heavy jitter brush has a predefined jitter distance parameter 306 that is smaller than the light and medium jitter brushes and a predefined jitter size parameter 408 that is larger than the light and medium jitter brushes. Therefore, the heavy jitter brush is leveraged to create vector objects with width variations that are greater in quantity and larger in magnitude than the light and medium jitter brushes. Further, the medium jitter brush has a predefined jitter distance parameter 306 and a predefined jitter size parameter 408 that are in between the predefined jitter parameters 210 of the light and heavy jitter brushes. Accordingly, the medium jitter brush is leveraged to create vector objects with width variations that are of moderate quantity and magnitude in comparison to the light and heavy jitter brushes.

In response to selecting a vector brush having predefined jitter parameters 210, a user draws strokes 302 with the vector brush to generate vector objects 206 representing the strokes 302 and having a variable width 214 determined in accordance with the described techniques and the predefined jitter parameters 210 associated with the selected vector brush. Alternatively or additionally, the predefined jitter parameters 210 of the light, medium, and/or heavy vector brushes are further refinable by the user, e.g., in a jitter parameters settings menu, such as user interface 602.

As shown, at least some of the selectable vector brushes presented via the user interface 600 have non-jitter shape characteristics. For example, the selectable vector brushes include a "basic round" vector brush to generate a vector object with round edges, a "basic taper" vector brush to generate a vector object with tapered edges, a "basic flat" vector brush to generate a vector object with flat edges, and so on. Notably, these vector brushes (i.e., the vector brushes in the user interface 600 other than the light, medium, and heavy jitter brushes) are not associated with predefined jitter parameters 210. Instead, an additional user interface is displayed that includes functionality for individually specifying the jitter parameters 210 in response to receiving a selection of one of these vector brushes. For example, the user interface 602 is presented in response to a user selection of the "basic" round vector brush at 606.

FIG. 6B depicts a user interface 602 for individually specifying the jitter parameters 210. For example, the jitter size parameter 408 is specified via user input to a first slider control 608. Further, the jitter distance parameter 306 is specified via user input to a second slider control 610. Values of the jitter size parameter 408 and the jitter distance parameter 306, corresponding to a positioning of the slider controls 608, 610, are also displayed in the user interface 602. Indeed, a percentage value 612 of the jitter size parameter 408 is increased in response to a user input to move the first slider control 608 in a rightward direction in the user interface 602, and vice versa. Moreover, a percentage value 614 of the jitter distance parameter 306 is decreased in response to a user input to move the second slider control 610 in a leftward direction, and vice versa. Although depicted as slider controls 608, 610, it is to be appreciated that the jitter parameters 210 are capable of being specified in other ways. In one example, a user provides text input into input boxes displayed in the user interface 602 to specify the percentage values 612, 614.

The user interface 602 also includes a "try this brush" feature, which includes functionality to display a preview vector object 616 based on a stroke 302 drawn in the space 618. For example, the vector object jitter application system 104 receives an input 204 defining a stroke 302 in the space 618, and in response, generates a preview vector object 616 representing the stroke 302 and having a variable width 214 determined by applying jitter in accordance with the described techniques. Notably, the jitter is applied to the preview vector object 616 in accordance with the jitter size parameter 408 and the jitter distance parameter 306 individually specified via the user interface 602. In this way, a user is able to preview how resulting vector objects would look based on the individually specified jitter parameters 210 without having to navigate away from the user interface 602.

Figure 7A:
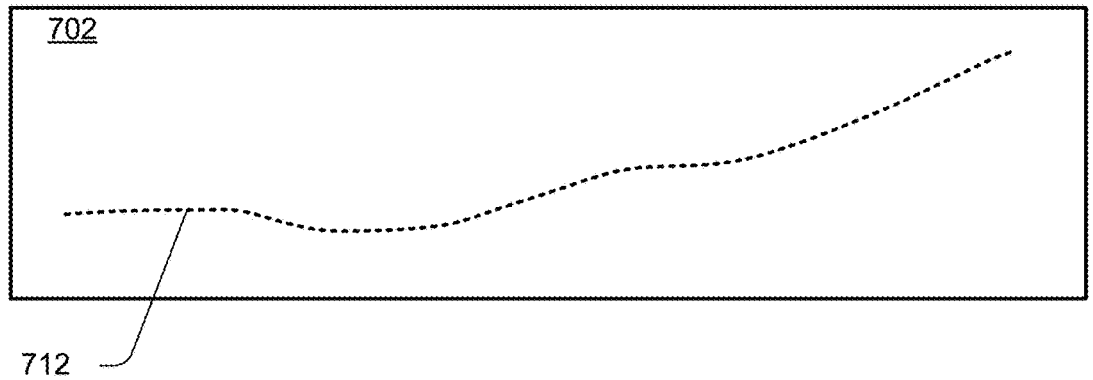
FIGS. 7A and 7B illustrate an example progression through various stages of vector object jitter application in accordance with one or more implementations.
Figure 7A:
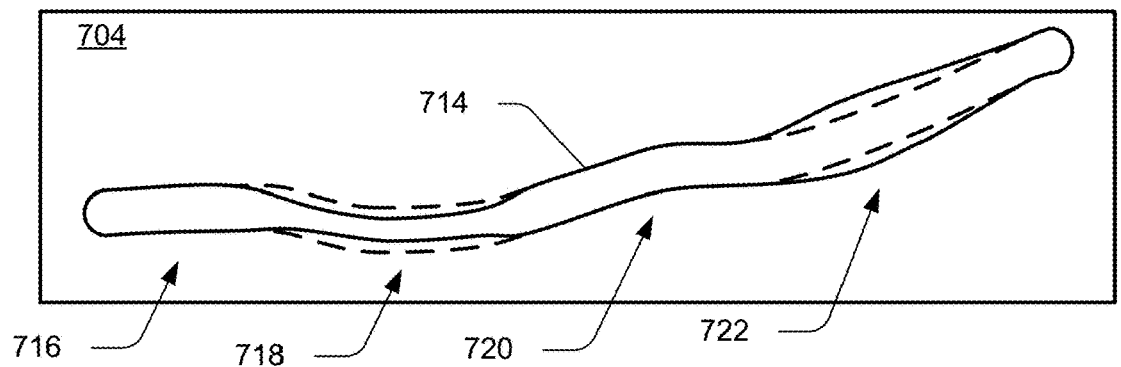
Figure 7B:
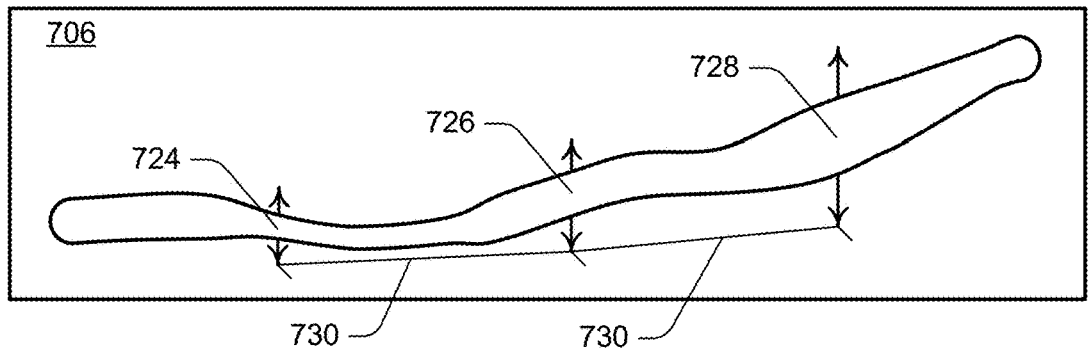
Figure 7B:
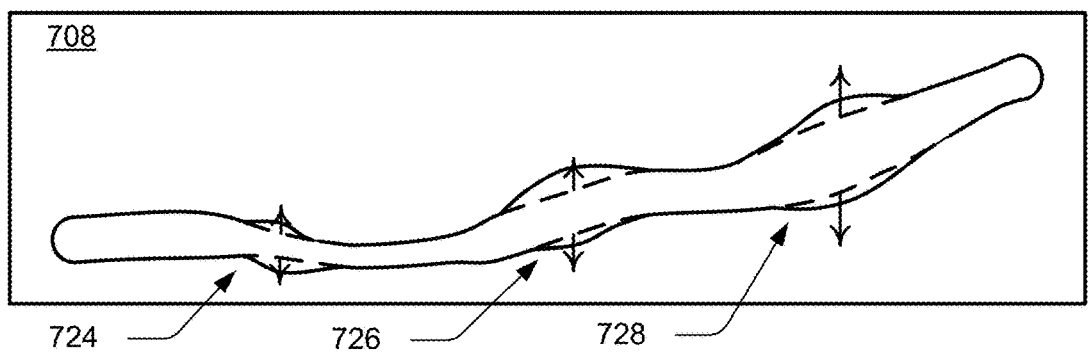
Figure 7B:
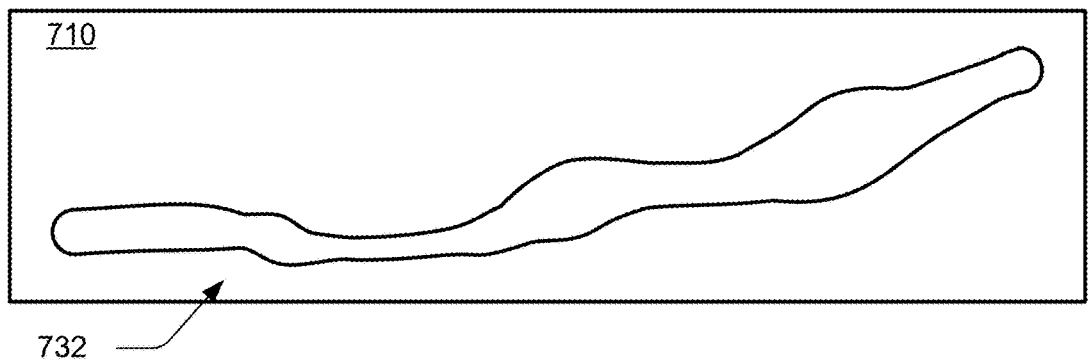

FIGS. 7A and 7B illustrate an example progression 700 through various stages 702, 704, 706, 708, 710 of vector object jitter application in accordance with one or more implementations. At a first stage 702 of the progression, an input 204 is received defining a stroke 712 in the user interface 110. The stroke 712 identifies a location in the user interface 110 where a vector object is to be generated in accordance with the described techniques. In one or more implementations, the stroke 712 is received as a plurality of input points 304 placed along the stroke 712 at defined time intervals during the input 204.

At a second stage 704 of the progression, an initial width 318 is determined for a vector object 714 generated along the stroke 712. In the illustrated example progression 700, the stroke 712 is drawn with a vector brush 312 having a nominal width that dictates how wide a vector object representing the stroke 712 is to be generated along the stroke 712. To determine the initial width of the vector object 714, the initial width determination module 216 modifies the nominal width of the vector brush 312 based on pressure data 314 and velocity data 316 associated with the input 204 that defines the stroke 712. In implementations, the pressure data 314 and the velocity data 316 are collected at each of the input points 304 along the stroke 712. Therefore, the initial width determination module 216 determines the initial width 318 of the vector object 714 by increasing the nominal width of the vector brush 312 at corresponding portions of the vector object 714 where the stroke 712 is drawn with increased pressure and/or decreased velocity, and by decreasing the nominal width of the vector brush 312 at corresponding portions of the vector object 714 where the stroke 712 is drawn with decreased pressure and/or increased velocity.

At stage 704, the dashed line illustrates the nominal width of the vector brush 312 used to provide the input 204 defining the stroke 712, while the solid line illustrates the initial width 318 as determined by the initial width determination module 216 in accordance with the described techniques. As shown, a portion of the stroke 712 corresponding to a first portion 716 of the vector object 714 was drawn with a baseline pressure and velocity, and as such, the initial width 318 of the first portion 716 of the vector object 714 corresponds with the nominal width. In contrast, a portion of the stroke 712 corresponding to a second portion 718 of the vector object 714 was drawn with increased velocity and/or decreased pressure as compared to the baseline pressure and velocity, and as such, the initial width 318 of the second portion 718 of the vector object 714 is less than the nominal width. The pressure data 314 and the velocity data 316 returns to the baseline pressure and velocity at a portion of the stroke 712 corresponding to a third portion 720 of the vector object 714, and as such, the initial width 318 of the third portion 720 of the vector object 714 corresponds with the nominal width. Further, a portion of the stroke 712 corresponding to a fourth portion 722 of the vector object 714 was drawn with decreased velocity and/or increased pressure as compared to the baseline pressure and velocity, and as such, the initial width 318 of the fourth portion 722 of the vector object 714 is greater than the nominal width.

At a third stage 706 of the progression, locations 724, 726, 728 along the stroke 712 where jitter is to be applied to the vector object 714 are determined based on a jitter distance parameter 306. As shown at stage 706, the locations 724, 726, 728 are separated by a uniform distance interval 730. For example, the input module 202 receives input specifying a jitter distance parameter 306, which in some instances represents a function of the nominal width. Further, the location determination module 402 calculates the uniform distance interval 730 based on the nominal width and the jitter distance parameter 306, and determines the locations 724, 726, 728 at every uniform distance interval 730 along the stroke 712.

Also at the third stage 706 of the progression, a maximum jitter amount 410 that is applicable to the vector object 714 is determined for each of the locations 724, 726, 728 based on a jitter size parameter 408. For example, the input module 202 receives input specifying a jitter size parameter 408, which in some instances represents a function of the initial width 318 of the vector object 714. Further, the maximum jitter calculation module 406 calculates a maximum amount of applicable jitter for each of the locations 724, 726, 728 based on the initial width 318 of the vector object 714 at the locations 724, 726, 728 and the jitter size parameter 408.

Since the maximum amount of applicable jitter is determined as a function of the initial width 318, the maximum jitter amount 410 differs among the locations 724, 726, 728 based on the initial width 318 of the vector object 714 being different at the locations 724, 726, 728. For example, the arrows in the stage 706 represent a maximum jitter amount 410 determined for the locations 724, 726, 728. As shown, the maximum jitter amount 410 determined for the location 724 is smaller than the maximum jitter amount 410 determined for the location 726. Further, the maximum jitter amount 410 determined for the location 726 is smaller than the maximum jitter amount 410 determined for the location 728. This is because the location 724 is associated with a smallest initial width, the location 726 is associated with an intermediate initial width, and the location 728 is associated with a largest initial width.

At a fourth stage 708 of the progression, a smooth noise function 412 is leveraged to apply jitter to the vector object 714 at the locations 724, 726, 728 in accordance with the jitter parameters. For example, the smooth noise function 412 determines a variable jitter amount 414 to apply at each of the locations 724, 726, 728. Notably, the variable jitter amount 414 determined by the smooth noise function 412 does not exceed the maximum jitter amount 410 determined for the locations 724, 726, 728. Indeed, the width of the vector object 714 is adjusted at each of the locations 724, 726, 728, but not beyond the illustrated arrows. In some implementations, as illustrated at the location 726, the width of the vector object 714 at a given location is adjusted by different variable jitter amounts 414 on either side of the vector object 714.

By using the smooth noise function 412 to apply the jitter, the variable width 214 of the vector object 714 is uniformly distributed at each of the locations 724, 726, 728 between the initial width of the vector object 714 and an adjusted width of the vector object 714 (as adjusted by the variable jitter amount 414). For example, at each of the locations 724, 726, 728, the variable width 214 of the vector object 714 gradually increases from the initial width 318 up to the adjusted width and then gradually decreases from the adjusted width back down to the initial width 318.

At a fifth stage of the progression, a jittered vector object 732 is output for display in the user interface 110 having the variable width 214 as determined by applying jitter in accordance with the described techniques. As further discussed below with reference to FIG. 8, the stages 702, 704, 706, 708, 710 of the progression occur in real time while the input 204 defining the stroke 712 is received via the user interface 110.

Figure 8:
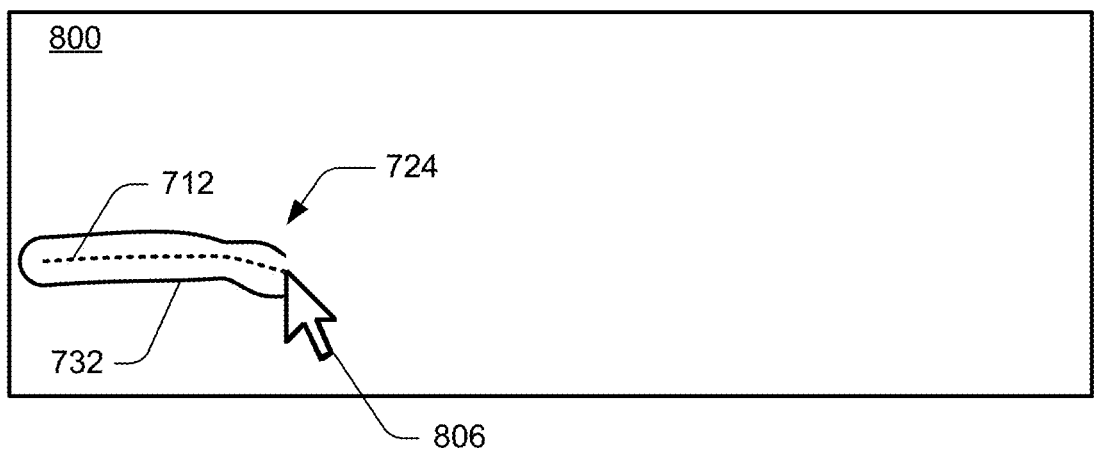
FIG. 8 illustrates examples of the jittered vector object of FIGS. 7A and 7B being displayed as an input defining a stroke is received via a user interface.
Figure 8:
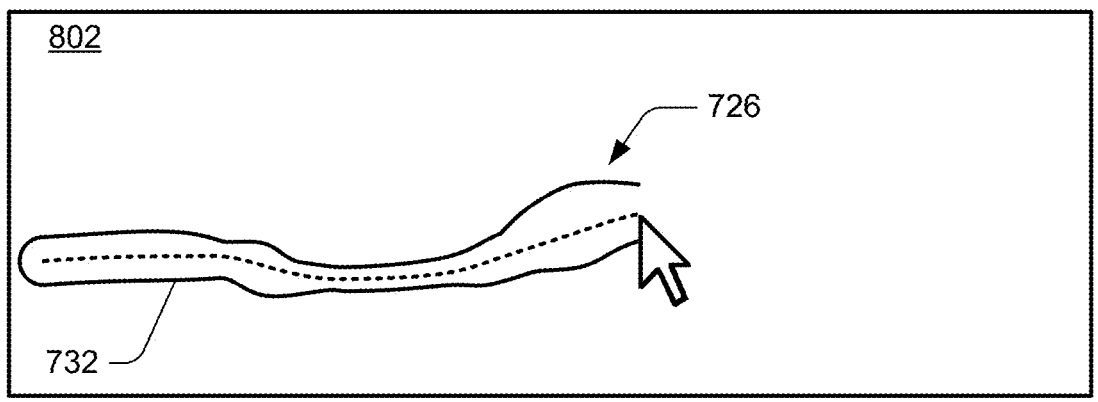
Figure 8:
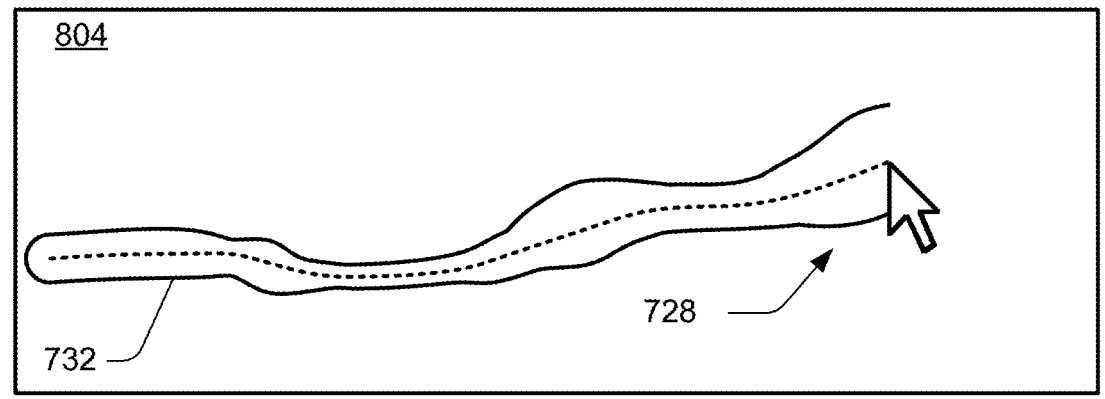

FIG. 8 illustrates examples 800, 802, 804 of the jittered vector object 732 of FIGS. 7A and 7B being displayed as an input 204 defining a stroke 712 is received via a user interface. The examples 800, 802, 804 include a cursor 806 which represents a current location of the input 204 defining the stroke 712. The examples 800, 802, 804 also include the locations 724, 726, 728 where jitter is applied to the jittered vector object 732.

As shown at the example 800, the jitter application module 218 outputs the jittered vector object 732 having the jitter applied at the location 724 concurrently while the stroke 712 is still being drawn. As further shown at the example 802, the jitter application module 218 outputs the jittered vector object 732 for display with the jitter applied at the location 726 concurrently while the stroke 712 is still being drawn. Similarly, as shown at the example 804, the jitter application module 218 outputs the jittered vector object 732 for display with the jitter applied at the location 728 concurrently while the stroke 712 is still being drawn. Notably, the examples 800, 802, 804 show that the jittered vector object 732 is generated and displayed in real time up to the current location of the input 204 defining the stroke 712.

In other words, the vector object jitter application system 104 is capable of adding the additional input points 310, determining the initial width 318 for the vector object 206, determining the variable width 214 for the vector object 206 by applying jitter to the vector object 206 using the smooth noise function 412 and in accordance with the jitter parameters 210, and generating the vector object 206 having the variable width 214 for display in the user interface 110 in real time as the input 204 defining the stroke 302 is received. This contrasts with conventional techniques which introduce variable visual characteristics to a vector object as a post-processing operation. Indeed, conventional techniques require a user to complete an input that defines a location for a vector object before generating and displaying a vector object at the defined location. Therefore, techniques implemented by the vector object jitter application system 104 provide a user with a more natural and organic drawing experience as compared to conventional techniques. This is because displaying the jittered vector object 732 as the user draws the stroke 712 mimics a physical drawing experience, e.g., as if the user is drawing using a physical writing utensil on a physical piece of paper.

Figure 9:
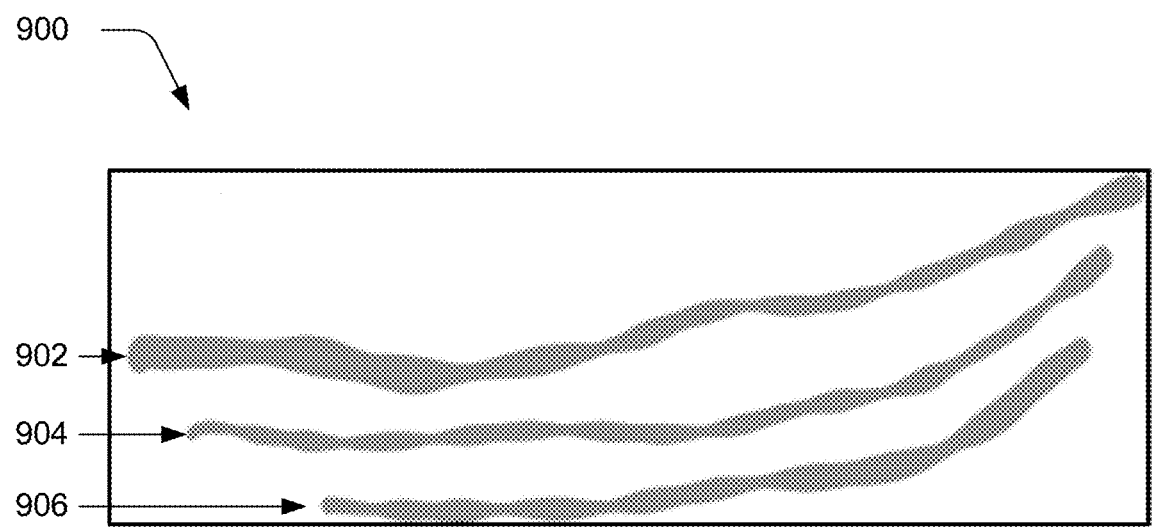
FIG. 9 illustrates an example showing jittered vector objects generated by the vector object jitter application system of FIG. 1.

FIG. 9 illustrates an example 900 showing jittered vector objects 902, 904, 906 generated by the vector object jitter application system 104 of FIG. 1. Notably, each of the jittered vector objects 902, 904, 906 represent strokes drawn with the same vector brush 312 having the same nominal width and with the same jitter parameters 210. As shown, jitter is applied at substantially similar uniform distance intervals along the jittered vector objects 902, 904, 906 regardless of how long the jittered vector objects 902, 904, 906 are. Further, the size of the width variations are different among different locations of a single jittered vector object 902, 904, 906, as well as among the different jittered vector objects 902, 904, 906. Therefore, the vector object jitter application system 104 enables a user to work with a single vector brush to generate multiple jittered vector objects 902, 904, 906 with different variable widths 214 that include uniformly dispersed width variations among the different jittered vector objects 902, 904, 906.

In contrast, vector objects generated with variable width using conventional techniques are dependent on the variable width of an input shape. Due to this, the width variations are dispersed differently depending on the length of a vector object generated using conventional techniques. For at least this reason, vector objects generated by the vector object jitter application system 104 have variable widths with a more organic and visually pleasing appearance, as compared to conventional techniques.

Example System and Device

Figure 10:
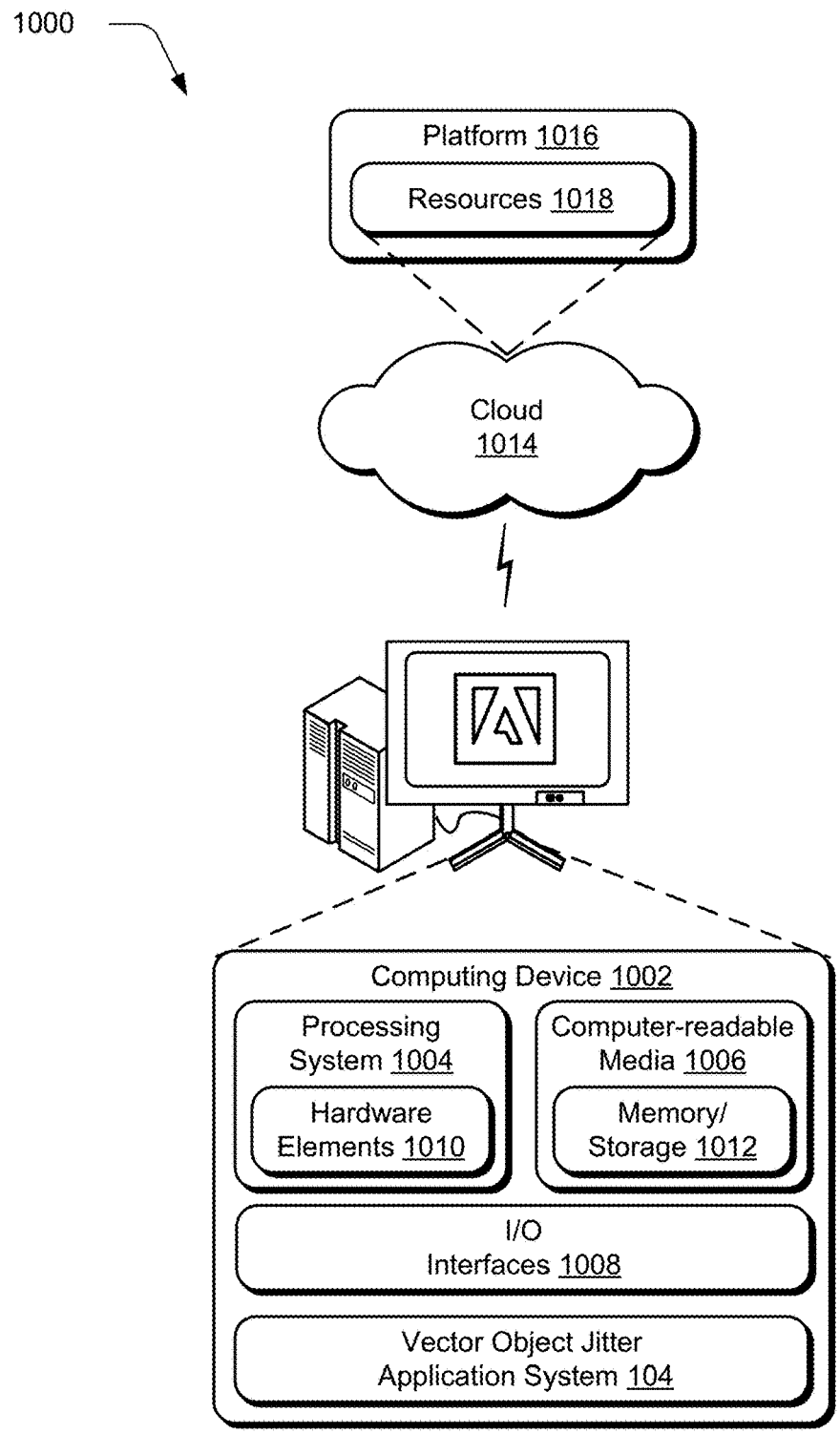
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that implement the various techniques described herein. This is illustrated through inclusion of the vector object jitter application system 104. The computing device 1002 is configurable, for example, as a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that is configurable as processors, functional blocks, and so forth. This includes implementation in hardware as an application specific integrated circuit or other logic device formed using one or more semiconductors. The hardware elements 1010 are not limited by the materials from which the hardware elements 1010 are formed or the processing mechanisms employed therein. For example, processors are configurable as semiconductor(s) and/or transistors, e.g., electronic integrated circuits (ICs). In such a context, processor-executable instructions are electronically-executable instructions.

The computer-readable storage media 1006 is illustrated as including memory/storage 1012. The memory/storage 1012 represents memory/storage capacity associated with one or more computer-readable media. The memory/storage 1012 includes volatile media (such as random access memory (RAM)) and/or nonvolatile media (such as read only memory (ROM), Flash memory, optical disks, magnetic disks, and so forth). The memory/storage 1012 includes fixed media (e.g., RAM, ROM, a fixed hard drive, and so on) as well as removable media, e.g., Flash memory, a removable hard drive, an optical disc, and so forth. The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supported by various configurations of the computing device 1002 and are not limited to the specific examples of the techniques described herein. This functionality is also implementable all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

What is claimed is:

1. A method comprising:
    receiving, by a processing device, an input defining a stroke to be drawn on a user interface;
    determining, by the processing device, a variable width of the stroke by leveraging a smooth noise function to apply jitter to adjust an initial width of the stroke at corresponding portions along the stroke;
    generating, by the processing device, a vector object representing the stroke, the vector object having the variable width; and
    displaying, by the processing device as the input is received, the vector object having the variable width in the user interface.

2. The method of claim 1, further comprising determining the initial width of the stroke by varying a constant width of the stroke based on pressure data and velocity data associated with the input.

3. The method of claim 1, wherein the smooth noise function is a Perlin noise function.

4. The method of claim 1, wherein:
    the determining the variable width includes applying the jitter at locations along the stroke separated by a uniform distance interval,
    the receiving the input includes receiving a plurality of input points defining the stroke in the user interface, and
    the generating the vector object includes adding at least one additional input point between a pair of proximate input points separated by greater than a threshold distance that is a function of the uniform distance interval.

5. The method of claim 4, wherein the determining the variable width includes controlling respective amounts of jitter to be applied to the vector object at the locations.

6. The method of claim 5, wherein the controlling the respective amounts of the jitter includes:
    determining, for each respective location at which the jitter is to be applied, a maximum jitter amount as a function of the initial width at the respective location;
    determining, for each respective location, a variable jitter amount using the smooth noise function that is less than the maximum jitter amount; and
    applying the variable jitter amount to the vector object at the locations.

7. The method of claim 6, wherein the maximum jitter amount is different at different locations along the stroke at which the jitter is to be applied.

8. The method of claim 6, wherein the determining the variable jitter amount at a respective location includes determining a first variable jitter amount and determining a second variable jitter amount that are less than the maximum jitter amount, and the applying the variable jitter amount includes applying the first variable jitter amount to a first side of the vector object at the respective location and applying the second variable jitter amount to a second side of the vector object at the respective location.

9. The method of claim 4, wherein the adding the at least one additional input point includes adding a number of additional input points between the pair of the proximate input points to maintain less than the threshold distance between input points along the stroke.

10. The method of claim 4, wherein adding the at least one additional input point includes adding up to a threshold number of additional input points between the pair of the proximate input points.

11. A system comprising:
    a processing device; and
    a computer-readable storage medium storing instructions that are executable by the processing device to perform operations comprising:
        receiving an input defining a stroke to be drawn on a user interface;
        determining locations along the stroke, at which, jitter is to be applied to the stroke;
        determining a variable width of the stroke by leveraging a smooth noise function to apply the jitter to adjust an initial width of the stroke at the locations along the stroke;
        generating a vector object representing the stroke, the vector object having the variable width; and
        displaying the vector object in the user interface.

12. The system of claim 11, the operations further comprising determining the initial width of the stroke by varying a constant width of the stroke based on pressure data and velocity data associated with the input.

13. The system of claim 12, wherein determining the variable width of the stroke includes controlling respective amounts of the jitter to be applied at the locations by:
    determining, for each respective location at which the jitter is to be applied, a maximum jitter amount as a function of the initial width at the respective location;
    determining, for each respective location, a variable jitter amount using the smooth noise function that is less than the maximum jitter amount; and applying the variable jitter amount to the vector object at the locations.

14. The system of claim 11, wherein the smooth noise function is a Perlin noise function.

15. The system of claim 11, wherein the receiving the input includes receiving a plurality of input points placed along the stroke in the user interface at defined time intervals.

16. The system of claim 15, wherein the generating the vector object includes adding at least one additional input point between a pair of proximate input points separated by greater than a threshold distance.

17. A non-transitory computer-readable medium storing instructions that are executable by a processing device to perform operations comprising:
   receiving an input defining a stroke to be drawn on a user interface;
   determining amounts of jitter to be applied to an initial width of the stroke;
   determining a variable width of the stroke by applying the amounts of the jitter at corresponding portions along the stroke and smoothing the variable width between the corresponding portions;
   generating a vector object having the variable width; and
   displaying the vector object in the user interface.

18. The non-transitory computer-readable medium of claim 17, wherein the determining the amounts of the jitter includes determining the initial width of the stroke by varying a constant width of the stroke based on pressure data and velocity data associated with the input.

19. The non-transitory computer-readable medium of claim 17, wherein the determining the variable width includes determining locations separated by a uniform distance interval along the stroke, at which, the jitter is to be applied, the variable width including the determined amount of the jitter applied at the determined locations.

20. The non-transitory computer-readable medium of claim 19, wherein:
   the receiving the input includes receiving a plurality of input points placed along the stroke in the user interface at defined time intervals; and
   the generating the vector object includes adding at least one additional input point between a pair of proximate input points separated by greater than a threshold distance that is a function of the uniform distance interval.

* * * * *